United States Patent [19]

Curiel

[11] Patent Number: 4,560,568

[45] Date of Patent: Dec. 24, 1985

[54] PROCESS FOR THE RECOVERY OF OIL FROM AVOCADO FRUIT

[76] Inventor: Maurice Curiel, 40 Nitzanim St., Neve-Oz, Petach-Ticvah, Israel

[21] Appl. No.: 572,314

[22] Filed: Jan. 20, 1984

[30] Foreign Application Priority Data

Jan. 9, 1984 [IL] Israel ................................. 67843

[51] Int. Cl.$^4$ ............................................. A23L 1/28
[52] U.S. Cl. .................................... 426/417; 426/429; 426/489; 426/655; 426/635; 260/412.4
[58] Field of Search ............... 426/429, 430, 651, 655, 426/615, 489, 417; 260/412, 412.4

[56] References Cited

U.S. PATENT DOCUMENTS

| | | | |
|---|---|---|---|
| 2,753,362 | 7/1956 | Owades et al. | 426/429 |
| 3,271,160 | 9/1966 | Kopas et al. | 426/417 |
| 3,816,389 | 6/1974 | Mihara et al. | 426/417 |
| 4,167,519 | 9/1979 | Hock et al. | 426/417 |

FOREIGN PATENT DOCUMENTS 0037174 6/1974 Israel.

OTHER PUBLICATIONS

Research Disclosure, Oct. '79, 18659.

Primary Examiner—Raymond Jones
Assistant Examiner—Marianne M. Cintins
Attorney, Agent, or Firm—Robert J. Koch

[57] ABSTRACT

The present invention relates to an integrated process for the recovery of a high quality oil and unsaponifiable matter from avocado fruit in a single extraction operation. According to the invention, the comminuted avocado fruit is contacted with an acetone solution which extracts the water from the avocado. The water-free avocado is subsequently contacted with an acetone solution, containing above 5% water whereby the oil from said water-free avocado is extracted and a spontaneous phase separation occurs. This separation enables an easy removal of the upper layer containing the unsaponifiable matter. By distilling out the acetone from the mixture oil-acetone-water, a high quality avocado oil is recovered. The residual dry cake of oil-free avocado can be successfully utilized as feed for animals.

13 Claims, No Drawings

PROCESS FOR THE RECOVERY OF OIL FROM AVOCADO FRUIT

The present invention relates to a simple method for the production of oil from avocado fruit. More particularly, the invention relates to a simple method for the recovery of oil and/or other valuable material from avocado fruit.

Avocado is a fruit which belongs to the Lauraceae family, originally found in Mexico and later spread in several places in South and Central America South and Central Africa as well as along the Mediterranean coast. The fruit is exceedingly variable in shape, size and colour. The form varies from round to pear-shaped with a long slender neck, the colour being from green to dark purple. The fruit has a greenish or yellowish flesh, of buttery consistency and rich nutty flavour containing about 20 to 25% oil, 65–70% water and about 10% dry matter (all percentages being by weight). Generally the fruit composition by weight is about 65% flesh and 35% skin and seed. In addition to the oil, the avocado contains a small amount of about 1.5% by weight of oil of unsaponifiable matter, as a distinct fraction, which by itself is a very valuable component useful in many creams and medicated ointments. The unsaponifible matter content of the avocado oil during the ripening process decreases to about 0.8% by weight, although the oil content by itself generally increases during the ripening process.

As known the term oil in a generic sense all substances that are greasy or oily fluids at ordinary temperature. The use of the term fat to include both fats and oils is becoming common, especially among chemists. The avocado oil is classified as a non-drying oil having a iodine value of below 100, generally in the range of between 71 to 95. The oil is similar to the olive oil but it has a higher content of vitamins and mono- and diglycerides. Some of the properties of the avocado oil are given in the following Table.

TABLE 1

| Properties of avocado oil | | |
| --- | --- | --- |
| Oil property | Minimum | Maximum |
| Acid value | 1 | 7 |
| Saponification value | 177 | 198 |
| Iodine Value | 71 | 95 |
| Hydroxyl value | 8 | 10 |
| R.I. (n.D. 40° C.) | 1,461 | 1,465 |
| Density (20–25° C.) | 0.910 | 0.916 |
| Solidification | −7° C. | −9° C. |

Fats may be recovered from oil-bearing tissues by three general methods with varying degrees of mechanical simplicity; (1) Rendering; (2) pressing with mechanical presses and (3) extraction with volatile solvents. The extraction method is in particular applied when the value of the oil is considerably greater as oil than as part of the meal, thus requiring a more complete extraction with volatile solvents.

In view of the peculiar composition of the avocado fruit, with its content of about 70% water and 20% oil, a single solvent extraction operation was considered unfeasible by the prior art. When the unsaponifiable matter from the avocado is required, the solvent extract containg the oil from the avocado is cooled to about 4°–5° C., which causes a precipitation of the unsaponifiable content. By evaporating the solvent from said precipitate, a relative pure fraction of unsaponifiable matter is obtained. According to Israeli Pat. No. 37174, a process is claimed for the extraction of the unsaponifiable fraction from natural fats, including avocado, wherein the fat is contacted with a solvent mixture containing a polar and a non-polar solvent which does not dissolve the fatty fractions of the fat. The solvent extract which contained the substantial proportion of the unsaponifiable fraction is evaporated leaving a residue of the unsaponifiable fraction. In particular good yields are claimed to be obtained when said mixture of organic solvents consists of methyl alcohol and benzene. The disadvantage of this method seems to be connected with recovery problems imposed for two different solvents.

It is an object of the present invention to provide a simple process for the recovery of oil from avocado fruit. It is another object of the present invention to provide a simple process for the recovery of oil of a high quality as well as of the unsaponifiable matter from avocado fruit in a single extraction operation. Thus the invention consists of a process for the separate recovery of oil and of the unsaponifiable matter from avocado fruit in a single extraction operation which consists in the following steps: (a) comminution of the avocado fruit; (b) contacting the comminuted avocado fruit by a solution comprising acetone whereby water present in said avocado fruit is extracted by the acetone; (c) extracting oil from the substantially water-free avocado fruit by an acetone solution followed by a spontaneous phase separation of the components in the system water-acetone-oil-unsaponifiable matter, providing that the water content in said system is above 5% by weight from the acetone present therein; (d) separating the upper layer containing the unsaponifiable matter from the mixture of oil-acetone-water, and (e) distilling out the acetone thus obtaining separately a substantially pure avocado oil and the unsaponifiable matter. The invention is based on the discovery that a clear and spontaneous separation of the phases occurs when the system contains above 5% and preferably above 10% by weight water from the acetone present in the system.

In contrast to the prior art methods which considered that two or more organic solvents will be required in order to recover the oil as well as the unsaponifiable matter from the avocado fruit, it has been found according to the present invention that acetone alone could be successfully utilized for extracting first the water from the avocado fruit followed by oil extraction with acetone. The phase separation is spontaneously in the presence of above 5% and preferably above 10% by weight water from the acetone present in the system, thus obtaining directly the desired valuable constituent, avocado oil and unsaponifiable matter, from the avocado fruit.

In order to enhance the desired component extraction, it is suggested to carry out the extraction of water from the avocado fruit by a solution of acetone at a temperature of between 10° C. to 25° C. thus avoiding some co-extraction of oil. Also in order to enhance the extraction of the oil from the avocado fruit by the acetone solution, it is suggested to perform this extraction at temperatures above the ambient temperature, preferably at a temperature in the range of between 40° C. to about 55° C., thus maximizing the yield of oil recovery.

The process according to the present invention has an additional advantage that the unsaponifiable matter, which is a valuable component by itself, can be easily recovered based on the same discovery as mentioned above that in the presence of above 5% and preferably above 10% by weight water from the acetone present in the system, a spontaneous separation of un upper phase containing the unsaponifiable matter occurs. The removal of said unsaponifiable matter, causes at the same time an appreciable up-grading of the avocado oil quality improving also its bright colour. This is in contrast to the known process for the recovery of the unsaponifiable matter which generally requires a prior saponification step followed by distilling out the solvent.

According to a preferred embodiment, the miscella of acetone with oil obtained in one of the steps of the process, is contacted with the comminuted avocado particles extracting out the water. The substantially water-free avocado fruit particles are subsequently treated by a solution of substantially pure acetone and further treated with water or acetone-water solution providing that the water content in the system is above 5% and preferably above 10% by weight of the acetone present therein, thus inducing a spontaneous phase separation. A compromise should be found keeping in mind that a better yield of oil is obtained when a pure acetone solution is utilized, while an easy and spontaneous phase separation is achieved when the water content in the system is increased. A person skilled in the art will certainly find said compromise based on the present invention and the specific facilities available in the plant in order to obtain the highest yield of oil recovery at the lowest possible costs.

The entire process can be easily performed and requires normal equipment utilized in liquid-liquid extraction operation such as mixer-settlers or extraction columns. The first step consists in cutting the avocado fruit and removing the seed followed by a comminution of the fruit. The peel and seed consist about 30 to 40% by weight of the total weight of avocado fruit. Generally, good yields of oil recovery are achieved when the comminution is effected into small particles of about 3 to 5 mm. The extraction is performed in a battery of at least 4 stages when a good recovery of oil can be achieved. Most preferably said battery will consist of six or even eight stages. The fresh comminuted avocado fruit is contacted with a solution containing acetone or miscella acetone-oil, whereby most of the water content of the avocado is extracted by the acetone. Generally about 3 parts by weight acetone to 1 part comminuted avocado fruit will be utilized. The substantially water-free avocado fruit is contacted with the acetone solution or miscella with a low oil content, preferably at a temperature in the range of between 40° to 55° C., the oil being extracted by the acetone. The spontaneous phase separation occurs when the system will comprise 5% and preferably above 10% by weight water from the acetone present in the system. An upper phase consisting of the unsaponifiable matter together with water and acetone and a bottom phase which consisted of acetone-oil-water are noticed. By distilling out the solvent from the upper phase, the unsaponifiable matter is separated out from the water. Most of the oil will be extracted from the avocado fruit after a few stages, the residual oil in the dry cake being about 1% only. The mixture of acetone-water-oil is introduced into a rectification column, distilling out the acetone and subsequently recycled in the process. The mixture of water-oil obtained after the acetone removal, separated out easily into a clear upper phase of avocado oil which was recovered.

While the invention will now be described in connection with certain preferred embodiments in the following Examples, it will be understood that it is not intended to limit the invention to these particular embodiments. On the contrary it is intended to cover all alternatives, modifications and equivalents as may be included within the scope of the invention as defined by the appended claims. Thus, the following Examples which include preferred embodiments will serve to illustrate the practice of this invention, it being understood that the particular described are by way of example and for purpose of illustrative discussion of preferred embodiments of the present invention only are presented in the cause of providing what is believed to be the most useful way to carry out the invention.

EXAMPLE 1

An amount of avocado fruit (Hass type) was comminuted to small particles of about 3 to 5 mm, after peeling and seed removal. The extraction of the oil from the avocado particles was effected in a batch experiment in 4 stages of extraction, each time utilizing a batch of 500 grams of avocado fruit particles with an amount of 1500 grams of acetone. Each stage took about 30 minutes. The first extraction with fresh acetone was carried out at a temperature of about 25° C. whereby most of the water present in the avocado fruit were extracted into the acetone phase. The other extractions operation of the substantially water-free avocado with acetone solution, were carried out at a temperature of about 55° 1 C.

All liquid solutions obtained from the extraction steps were admixed and cooled to ambient temperature, thus obtaining two main fractions which separated out:
(1) an upper layer of oil-acetone-water which contained mainly the unsaponifiable matter and
(2) a lower phase of oil-acetone-water, which contained the main fraction of avocado oil.

The acetone was removed by distillation and recycled to the extraction operation.

The oil separated out as the upper phase above the aqueous phase. The recovered crude oil contained the vitamins, the flavour and colour of the avocado fruit. The residual cake of avocado, after the oil removal, was heated and the acetone present therein was evaporated by live steam at 80° C. and conveyed to a condenser for its recovery. The dried cake had the following composition: 13% protein; 1.65% oil and 15% humidity (all percentage being by weight) and could be successfully utilized as feed for animals.

EXAMPLE 2

An amount of avocado (Hass type) was comminuted to small particles of about 3 to 5 mm after peeling and seed removal. The extraction of the oil from the avocado fruit particles was effected in a batch type extractor-mixer by spraying and washing of the particles first with a miscella consisting of a solution of acetone containing between 6% to 10% by weight oil followed by a pure acetone solution. In all steps of the operation, the extraction was carried out by spraying of the miscella or pure acetone above the avocado fruit particles, the solution obtained from said perculation being more and more rich in oil and was stored for a further extraction operation.

The steps of the operation in this experiment were as follows:

Step 1;

Rich miscella, containing about 10% oil (by weight) and 90% acetone was sprayed above the entering fresh avocado fruit particles and recirculated for about 20 minutes at room temperature. At the end of this operation, most of the water present in the avocado particles was extracted by said miscella.

Step 2:

Miscella containing about 6% oil and 94% acetone, was sprayed above the substantially water-free avocado particles and recirculated for about 20 minutes at a temperature of about 55° C. At the end of this step, part of the oil from said avocado particles was extracted into the miscella which became richer in oil. The miscella mixture obtained was stored for a further extraction for step 1.

Step 3:

The same operation as in step 2, but the miscella utilized in the extraction contained about 4% oil and 96% acetone. The miscella resulted was stored for a further extraction for step 2.

Step 4:

The same operation as in step 2, but the miscella utilized in the extraction contained 1.5% oil and 98.5% acetone. The miscella resulted was stored for a further extraction for step 3.

Step 5:

The same operation as in step 2, but the miscella utilized in the extraction contained only 0.5% oil and 99.5% acetone. The miscella resulted was stored for a further extraction for step 4.

Step 6:

The same operation as in step 2, but the solvent introduced for the oil extraction consisted of pure acetone. The solution was recirculted for about 20 minutes at a temperature of about 55° C. Most of the oil from the avocado fruit particles was extracted into the acetone phase, the miscella solution being stored for a further extraction for step 5. The various miscella solutions obtained in steps 2, 3, 4, 5 and 6, were stored for the further extraction operations.

The miscella obtained in step 1, which contained a mixture of oil-acetone-water, was cooled and left for about 4 hours, whereby two main fractions separated out:

(a) an upper layer of oil-acetone-water which contained most of the unsaponifiable matter, and (b) a lower phase of oil-acetone-water, which contained the main fraction of avocado oil. The acetone was removed by distillation and recycled to the extraction step. The oil separated out as the upper phase above the water.

The residual cake was treated as in Example 1 and utilized as feed for animals.

I claim:

1. A process for the separate recovery of oil and of the unsaponifiable from avocado fruit in a single extraction operation, comprising the steps of: (a) comminuting the avocado fruit; (b) contacting the comminuted avocado fruit with acetone for an amount of time and at a temperature sufficient to extract water present in said avocado fruit, thereby rendering the avocado fruit substantially water-free; (c) contacting the substantially water-free avocado fruit with acetone having a water content of above 5% for an amount of time and at a temperature sufficient to extract oil present in said avocado fruit which results in a spontaneous phase separation of the water-acetone-oil-unsaponifiable matter; (d) separating the upper layer containing the unsaponifiable matter from the oil-acetone-water; (e) distilling out the acetone; and (f) removing the water to obtain separately a substantially pure avocado oil and the unsaponifiable matter.

2. A process according to claim 1, wherein in step (d) the water present in the system water-acetone-oil-unsaponifiable matter is above 10% by weight from the acetone present therein.

3. A process according to claim 1, wherein the unsaponifiable matter is recovered by distilling out the acetone present in said upper layer.

4. A process according to claim 1, wherein the extraction of water from the avocado fruit is carried out by a miscella of acetone containing avocado oil.

5. A process according to claim 1, wherein the extraction of water from the avocado fruit is carried out at a temperature in the range of between 10° to about 25° C.

6. A process according to claim 1, wherein the extraction of oil from the substantially water-free avocado fruit is carried out by a solution of pure acetone.

7. A process according to claim 1, wherein the extraction of oil from the substantially water-free avocado fruit is carried out by a miscella of acetone and avocado oil.

8. A process according to claim 1, wherein the extraction of oil from the substantially water-free avocado fruit is carried out at a temperature in the range of between 40 to 55° C.

9. A process according to claim 1, wherein the avocado fruit is comminuted into small particles of about 3 to 5 mm size.

10. A process according to claim 1, wherein the extraction is carried out in a battery of at least 4 stages of mixers settlers.

11. A process according to claim 1, wherein about 3 parts by weight acetone per 1 part of avocado fruit are introduced into the extraction step.

12. A process for the recovery of oil and unsaponifiable matter from avocado fruit by extraction, comprising the steps of: (a) comminuting fresh avocado fruit; (b) extracting the comminuted, fresh avocado fruit with a miscella of acetone and avocado oil at a temperature of from about 10° C. to about 25° C., said temperature resulting in the extraction of substantially all the water in the fruit and simultaneously minimizing the coextraction of oil and unsaponifiable matter, the extracted fruit being substantially free of water, and the water content in the miscella after the extraction being above about 5% by weight; (c) extracting the substantially water-free avocado fruit in sequential steps with a plurality of acetone solutions containing decreasing concentrations of avocado oil, and at a temperature of from about 40° C. to about 55° C., the last step being the extraction of the fruit with pure acetone; (d) cooling the water-containing miscella obtained from extracting the fresh avocado fruit to ambient temperature to effect a two-phase separation; and (e) separating an upper phase of oil-acetone-water containing most of the unsaponifiable matter, from a lower phase of oil-acetone-water containing the main fraction of avocado oil.

13. The process of claim 12, including distilling separately the upper and lower phases from step (e) to remove the acetone, thereby leaving mixtures of unsaponifiable matter and water, and avocado oil and water, respectively; and phase separating the unsaponifiable matter and the avocado oil from the water.

* * * * *